United States Patent [19]

Hitch

[11] Patent Number: 4,819,614
[45] Date of Patent: Apr. 11, 1989

[54] DUEL FUEL BARBECUE GRILL
[75] Inventor: Robert J. Hitch, Columbus, Ga.
[73] Assignee: W. C. Bradley Company, Columbus, Ga.
[21] Appl. No.: 213,109
[22] Filed: Jun. 29, 1988
[51] Int. Cl.[4] .............................................. F24C 1/02
[52] U.S. Cl. .................................... 126/36; 126/41 R; 126/25 R
[58] Field of Search ................ 126/41 R, 41 D, 41 E, 126/36, 25 R; 99/339, 340, 447

[56] References Cited

U.S. PATENT DOCUMENTS

| | | | |
|---|---|---|---|
| 3,295,509 | 1/1967 | Harvey | 126/36 X |
| 4,442,824 | 4/1984 | Amici | 126/25 R X |
| 4,706,643 | 11/1987 | Tyson | 126/36 X |

Primary Examiner—Randall L. Green
Attorney, Agent, or Firm—Hurt, Richardson, Garner, Todd & Cadenhead

[57] ABSTRACT

A barbecue grill assembly is disclosed having a dual mode of operation for cooking with charcoal briquettes or with a burner element. The firebox of the grill includes a burner element near the floor thereof and an aperture in one of the sidewalls for receiving a tray member. The tray member has channels for receiving charcoal to be ignited by the gas burner and which, in its 180° inverted position, acts as a shield for the burner. Positive locking is accomplished with spring-clips and by bimetallic lever arms which lock the tray in the tracks when heated.

20 Claims, 3 Drawing Sheets

DUEL FUEL BARBECUE GRILL

BACKGROUND OF THE INVENTION

Grilling food on a barbecue grill can normally be accomplished in one of two ways. A typical charcoal grill utilizes charcoal briquettes which are ignited with lighter fluid. The briquettes are then left to burn until the entire coal is heated through and glowing, at which time the grill is normally ready for use. As the charcoal is consumed, ash is formed from the surface of the briquette and falls to the bottom of the grill where it is periodically removed.

The second type of grill is a gas-fired or electric unit which normally utilizes one or two burners that are fueled with natural or propane gas and ignited, or which utilizes an electric heating element. A radiant material, such as lava rock, disposed above the burners or element, normally on a wire grate, absorbs heat from the gas flame or electric element and conducts it to the food to be cooked thereabove.

These systems are, for the most part, mutually exclusive in that regular charcoal can not be used in a gas grill due to problems with ash clogging the burners, and radiant material used in gas or electric grills is not designed for or capable of sustained burning as is normal charcoal. Each system, however, has its particular advantages and/or disadvantages. Grilling with normal charcoal imparts a smoked flavor to foods cooked thereover, however it is a relatively slow procedure from ignition to actual cooking. Cooking on a gas-fired or electric unit is generally faster, however, the smoked flavor imparted by normal charcoal is normally not obtained from the inert radiant material.

Thus, a choice must normally be made, either to buy two grills, one of each type, or to forego the advantages and/or disadvantages of one type in favor of the other. Many other considerations are also presented including space requirements, expense, safety factors, and personal preference.

SUMMARY OF THE INVENTION

It is, therefore, one of the principal objects of the present invention to provide a dual fuel grill with two modes of operation, which may be used as an electric or gas-fired unit and includes a suitable burner element, or which may be used as a charcoal grill, the burner being used for ignition of the charcoal and possibly as an auxiliary heat source in the charcoal mode.

Another object of the present invention is to provide a removable element within the body of the grill that serves as a holder and ash collector for charcoal when cooking with this medium and also as a radiant means when using the burner alone for cooking.

A further object of the present invention is to provide a grill assembly capable of two modes of cooking without any substantial change in the dimensions of the grill or in cooking efficiency or procedure.

A still further object of the present invention is to provide a dual fuel grill assembly that is easy to maintain and which is durable to provide a long service life.

These and additional objects are attained by the present invention which relates to a dual fuel barbecue grill assembly having the capability of cooking food either with the electric or gas burner element or with conventional charcoal. The assembly includes a firebox with a gas or electric burner element therein. Support means are disposed in the firebox above the burner and are either integral with or spaced from and generally longitudinally parallel with the side walls of the firebox. A tray means is slidably received by the support means and has two mounting positions, a first position and a second position being disposed 180° from the first position. The tray means includes a plurality of generally parallel channel means extending crosswise between the support means and above the burner element and which in the first position, present a generally concave, trough-like upper configuration as the surface for receiving charcoal therein. In the second position, the bar means present a generally convex upper surface for acting as a radiant and for shielding the burner from grease, the second position being used in the gas or electric mode of cooking.

The tray means also includes deflection means for diverting heat or grease and for catching any overflow ash from the charcoal and a safety feature in the form of a bimetallic locking means which locks the tray means in operative position upon heating thereof. When cooking with charcoal, for example, the tray is disposed in the first position, the concave channel means receiving and containing the charcoal therein where it is ignited by the burner. Upon finishing the cooking with charcoal and the cooling of the locking means, the tray can be slid out of its mounted position, emptied of the ash and either replaced for further charcoal cooking or inverted for cooking with the burner. In the second or inverted position, the now convex upper surface of the channel means serves as a radiant means over which food may be cooked and as a deflection means to direct grease and similar drippings away from the burner element.

Various additional objects and advantages of the present invention will become apparent from the following detailed description, with reference to the accompanying drawings.

DETAILED DESCRIPTION OF THE PREFERRED EMBODIMENT

Figure 1:
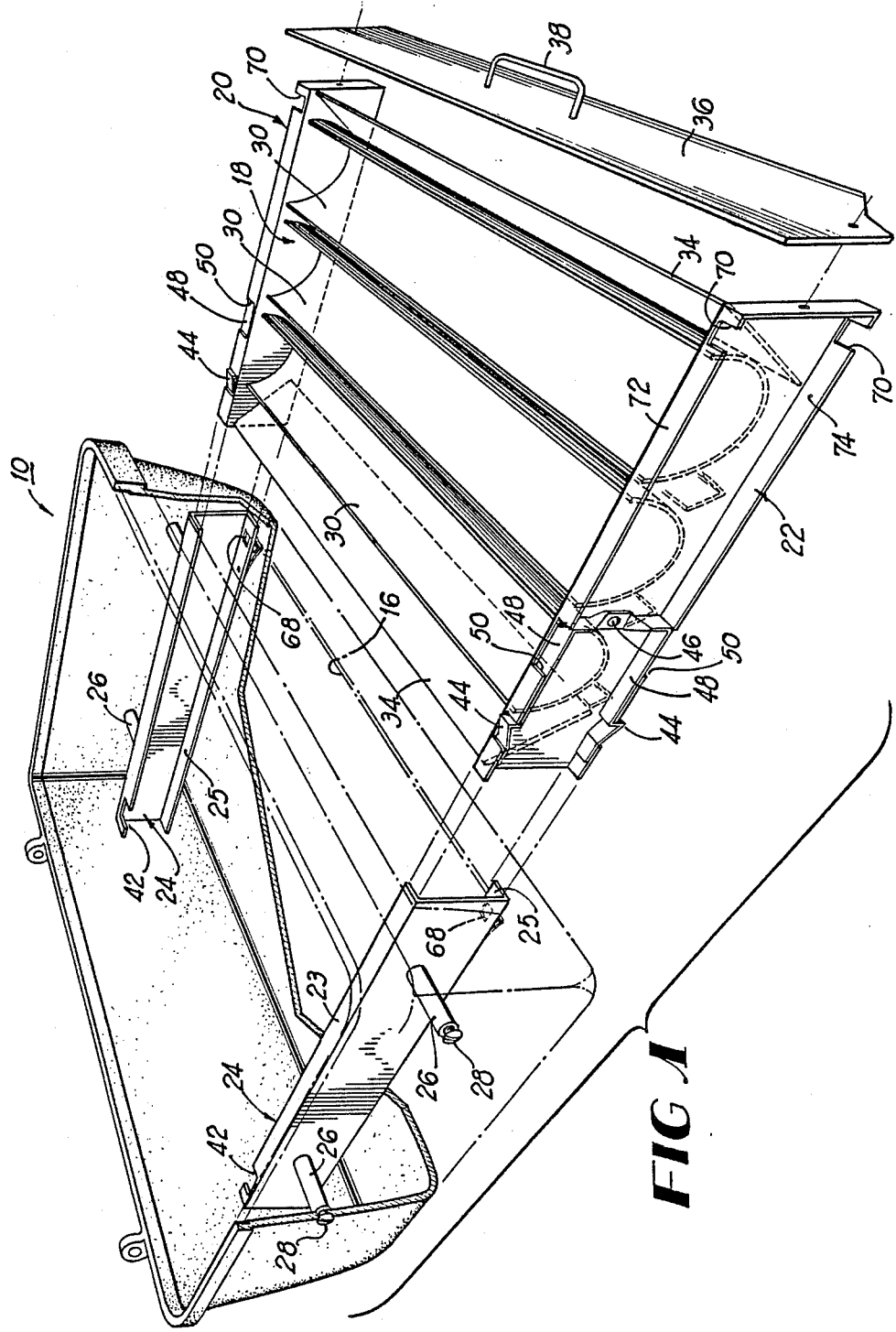
FIG. 1 is an exploded, partial perspective view of the present dual fuel barbecue grill assembly, having portions of the grill and firebox broken away or shown in phantom lines, the view showing the relationship between the firebox and the tray means.
Figure 2:
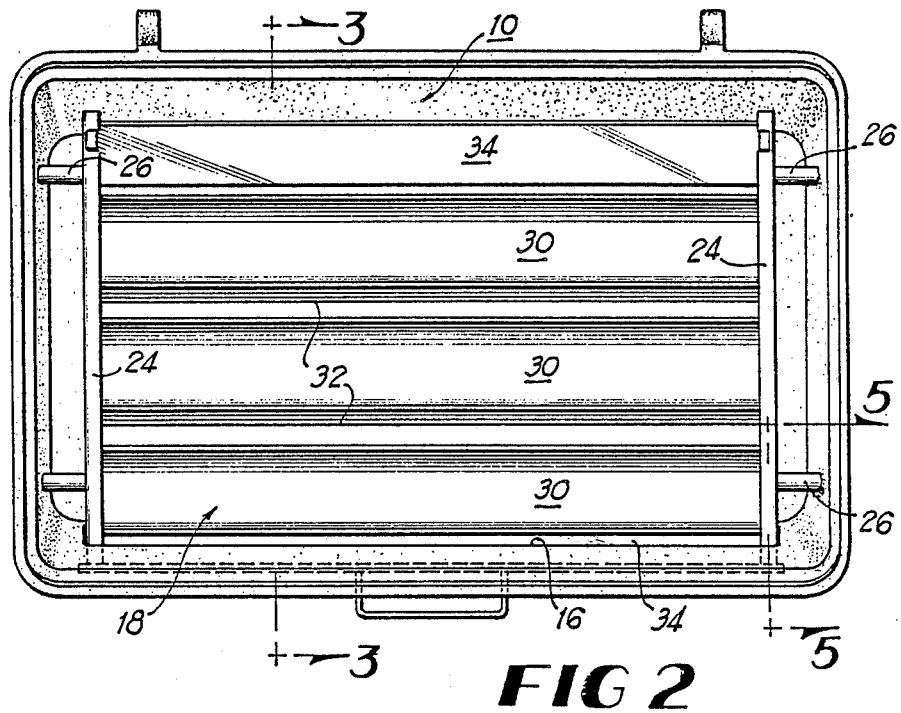
FIG. 2 is a partial top plan view of the present invention in assembled relationship.
Figure 3:
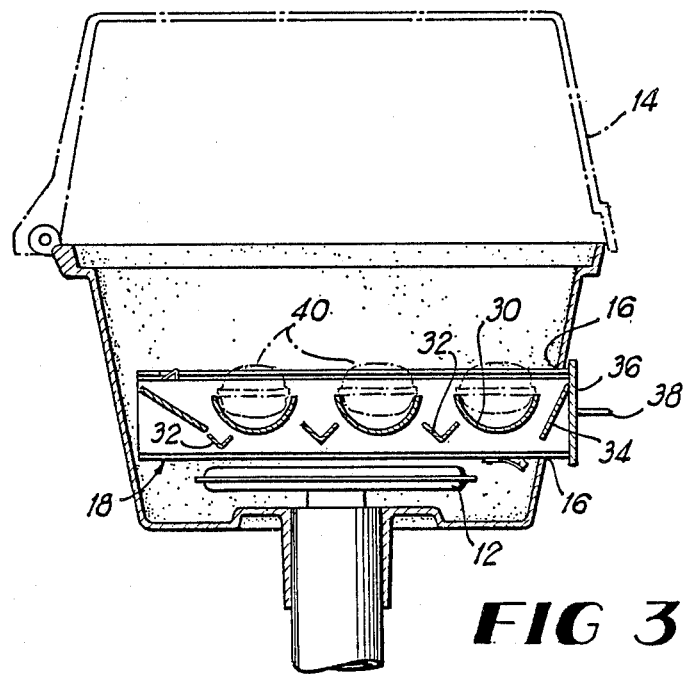
FIG. 3 is a cross-sectional view of the present invention, shown set up for cooking with charcoal, the view being taken on line 3—3 of FIG. 2.

Referring now more specifically to the drawings, and to FIG. 1 in particular, numeral 10 designates generally a firebox of a gas or electric barbecue grill assembly. Such grills are normally mounted on a stationary post as shown in the drawings or on a movable cart and include either a gas burner 12 or electric heating element (not shown) mounted near the bottom of the firebox, as shown in FIG. 3. The gas burner 12 can be connected to a natural gas supply line from the house or to a propane tank. The grill will also normally have a hinged hood 14 which, in closed position, is designed to substantially cover the open-topped firebox. To simplify the following description, references to a burner element are meant to include both the gas-fired type and the electric heating element type. Similarly, where the description refers to upper and lower members with regard to the tray means to be described hereinbelow, the designation of upper or lower will be in reference to specific figures, since, as will be discussed, the tray means can be inverted and used in either position.

The present invention is designed to be used with this basic grill structure shown in FIG. 1, with certain necessary modifications. The firebox 10 is provided with an opening 16 in one of the walls thereof, generally in the front wall as shown in FIGS. 1 and 3, although certain other accessways are contemplated as being within the scope of the present invention. For example, the tray means may also be placed into the grill from the opened top end of the firebox and then lowered onto suitable supports, or the accessway could be provided through the side or rear walls.

The opening 16 is designed to receive a tray means 18, composed of steel or a suitable heat resistant alloy or material, which serves as a combination charcoal receiving and retaining means and as a heat radiant means. Tray 18 includes right and left side panels 20 and 22 respectively, as viewed in FIG. 1, which are received in track means 24, the tracks being secured in parallel longitudinal relation to the side walls and within the firebox above burner 12. The tracks include inwardly extending upper and lower flanges 23 and 25, respectively. The track means are normally mounted on struts or posts 26 which project laterally from the sides of the firebox and are secured with screws 28 or other suitable means. The track means may also be formed integrally with the side walls of the firebox and as discussed hereinabove, the accessway for the tray 18 may be at any of the four sides of the firebox with appropriate location of the opening and the track means, such variations being considered within the scope of the present invention.

Secured and spanning in crosswise relation between side panels 20 and 22 are a plurality of generally semicircular primary channel means 30 which extend between panels 20 and 22 and are fastened thereto in any suitable manner, as by welding, bolts, etc. Disposed in the interstices between the primary channels and in a plane below the convex side thereof are a plurality of secondary channel means 32 which are generally V-shaped. While the shape of the primary and secondary channel means may vary, for example, the primary channels may be generally V-shaped and the secondary channels may be semicircular, a preferred embodiment is shown with the openings formed by the opposed side walls of the primary and secondary channels facing the same direction, as further explained hereinbelow.

Tray 18 further includes baffle plate means 34 near the front and rear sides of the tray, extending between and fastened to the opposed side panels 20 and 22. These baffles also serve a dual purpose, as will be explained in detail below. The tray has a face plate 36 which is attached to the side panels such as with screws (not shown) or other suitable fasteners, the face plate having a handle 38 mounted on its outer surface for use in inserting and removing the tray from the firebox.

Figure 4:
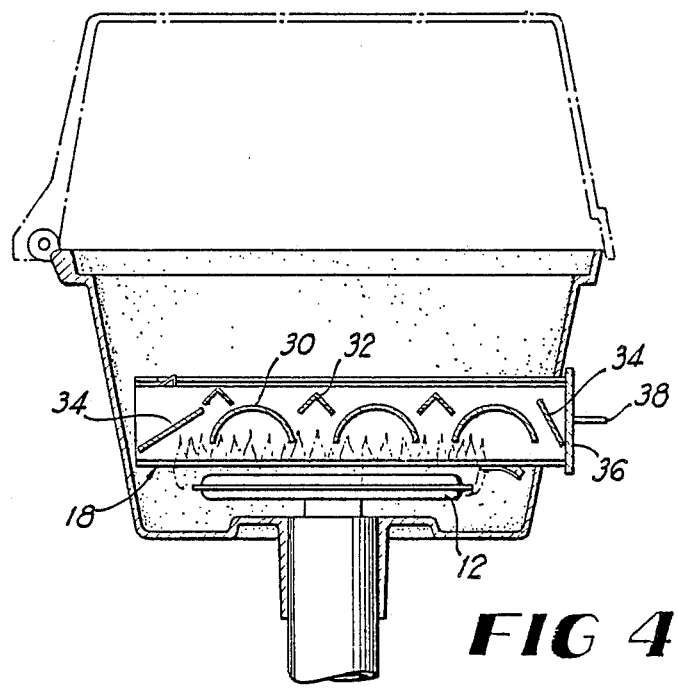
FIG. 4 is a cross-sectional view of the present invention, shown her set up for cooking using the gas burner.

Using FIGS. 3 and 4 for comparison purposes, it will be seen that tray 18 can be inserted into the firebox of the grill with the openings formed by the opposed sides of the channel means 30 and 32 either facing upwardly, as shown in FIG. 3 or downwardly, as shown in FIG. 4. The tray is simply removed from the firebox and inverted, depending on the desired mode of cooking. The grill is shown set up for cooking with conventional charcoal in FIG. 3. Charcoal briquettes 40 (shown in broken lines) are disposed in primary channels 30, which are of a sufficient width to substantially fully receive the briquettes, which are normally about 2-2½ inches square. The secondary channels 32 in this mode serve as ash catching means for charcoal ashes which may fall outside the primary channels and, in combination with baffles 34, as flame deflection means for directing the flame from the burner mounted therebelow toward the primary channels.

For operation in the charcoal mode, the charcoal briquettes 40 are placed in channels 30, normally in closely spaced relation for even cooking although this may vary depending on the user's preference or the amount of food being cooked among other factors. Charcoal lighter fluid is not necessary because ignition of the briquettes is accomplished using the burner 12. The burner is lit and the briquettes are ignited by a combination of direct flame impingement from the burner and by convection, heating of the primary channels being transmitted to the charcoal briquettes in contact therewith. When the briquettes have begun to burn sufficiently to maintain combustion, the burner may be turned off and cooking heat is supplied exclusively by the hot coals and the tray which is heated by the burning coals. For certain cooking applications, the burner element may be left on as an auxiliary heat source. In addition, the ash produced from the burning coals is retained mainly in the primary channels 30, with any overflow being caught by the secondary channels 32, thereby preventing the ash from falling upon the burner 12. Thus, in this position the channels effectively retain the charcoal in place for cooking and prevent the ashes from reaching the burner, preventing clogging of the burner and simplifying clean-up by keeping the ash substantially within the confines of the tray 18.

Referring to FIG. 4, the tray is shown in position for cooking in the gas mode, inverted 180° from the position shown in FIG. 3. In this position, the channels also have a dual function, serving as a radiant means and as a grease deflection and incineration means. With the burner ignited, the channels 30 and 32 are quickly heated to a temperature sufficient for cooking, in part due to their metallic construction and in part due to their orientation over the burner, the now downwardly facing concave or open sides and the equally reversed baffles 34 tending to concentrate the flames and the heat produced by the burner. In this mode, the burner remains lit during cooking.

The now inverted channels are also heated to a temperature which is sufficiently high to incinerate substantially all of the grease and other liquids dripping from the food being cooked thereover. The now upper-facing convex surface of the channels presents a large surface area upon which incineration may occur, thus preventing the grease, etc. from impinging on the burner and adding flavor to the food from the vapors produced by the incineration. As can be seen in FIG. 4, the channels substantially shield the entire burner, thereby preventing clogging and maintaining the burner in a clean condition.

While operating the present grill assembly in either cooking mode, the tray 18 becomes extremely hot, thus safety means are provided to lock the tray in place in the supporting tracks until it has cooled sufficiently to be safely removed. The tray supporting means or tracks 24 are formed with cutout portions or notches 42 in each of the upper flanges 23, near the rear portion of the flange, as shown in FIG. 1. The notches are designed to receive opposed, vertically spaced spring-loaded clips 44, which are mounted near the rear of the tray side panels 20 and 22 on both the upper and lower edges, as shown. The clips are formed as right angular members, and are also composed of a suitable metal. The clips have a central point of connection to the panels 20 and 22 at rivet or fastener 46, with arms 48 extending radially along the rear edges of the side panels. Thus, regardless of the orientation of the tray 18, the spring clips 44, which are disposed on the then upper edge of the tray as inserted, engage the cutout portions 42 when the tray is fully inserted, thereby holding the tray in the tracks. Removal of the tray is accomplished by depressing the arms 48 through openings 50, which are formed in flanges 72 and 74 of the side panels, thereby disengaging clips 44 from notches 42.

Figure 5:
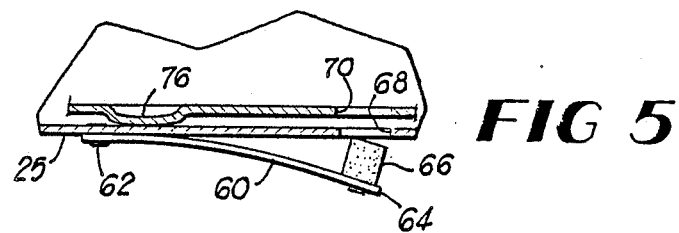
FIG. 5 is a partial, cross-sectional view of the locking device for the tray means, shown in unlocked, position; the view being taken on line 5—5 of FIG. 2.
Figure 6:
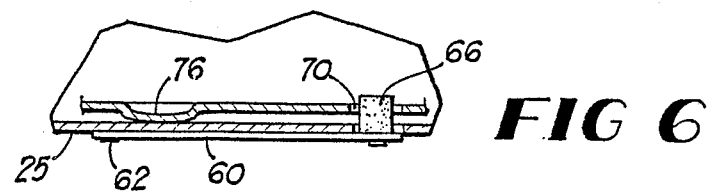
FIG. 6 is a cross-sectional view of the locking device, shown here in locked position.

Referring in particular to FIGS. 1, 5, and 6, an additional, positive locking, safety feature is illustrated. Mounted on both flanges 25 of track members 24 are lever arms 60, secured thereto at one end in a suitable manner as with rivets 62. The lever arms are composed of a suitable bimetal alloy and the free ends 64 are biased away from the flanges 25 when the tray is unheated, the position shown in FIG. 5. Mounted near the free ends 64 of the lever arms 60 are stop means such as blocks 66, the blocks being positively secured thereto.

Flanges 25 are also provided with apertures 68 and the side panels 20 and 22 are provided with notches 70 in both the upper and lower edge flanges 72 and 74, respectively as shown in FIG. 1. The apertures 68 and the notches 70 of either the upper or lower flanges 72 and 74, depending on the orientation of the tray 18, are disposed in alignment with one another when the tray 18 is in a fully inserted position. In this position, the aligned apertures 68 and the notches 70 are also in position to receive blocks 66 as the bimetallic lever arms 60 are heated, such heating of the alloy causing the blocks to move into the space defined by the aligned apertures and notches, as shown in FIG. 6. Alignment of the apertures 68 and the notches 70 is facilitated by leveling means such as bumpers 76, formed in flanges 72 and 74 near apertures 70, which maintain the flanges 72 and 74 in parallel orientation with flanges 25 by counteracting the weight of the tray itself and serving as front feet for the tray.

The lever arms remain in the position shown in FIG. 6, thereby locking the tray 18 in place and preventing its removal until the lever arms have cooled, the differing coefficients of expansion of the bimetal alloy causing the lever arms to retract the blocks from the aligned apertures and notches. With the tray thus cooled and the lever arms in the retracted position as shown in FIG. 5, the tray may be removed for reversing its position, cleaning, etc. after releasing spring clips 44.

In the use and operation of the present dual fuel barbecue grill, the tray 18 is inserted into the firebox in one of two possible orientations, either with the channels 30 disposed with the openings formed by the opposed sides of the channels facing upwardly for receiving charcoal, or with the openings facing downwardly, the channels then acting as a radiant means. In the charcoal mode, the charcoal is placed in the channels 30 and ignited by the underlying burner, as shown in FIG. 3. The ash from the charcoal is captured within the channels and the burner may then be extinguished when the charcoal has ignited.

When operating in the gas or electric modes, the tray is inverted and the opening formed by the opposed sides of the channels 30 is disposed in a downwardly facing position. The heat produced by the underlying burner is thus concentrated both on and by the channels, providing incineration of most of the liquids dripping from the food being cooked on the grill. The channels also function as a radiant means while in this position, the metallic construction serving to absorb and retain the heat from the burner and to radiate the heat to the food above.

Means are provided for positively locking the present assembly after its insertion into the firebox of the grill. Clips 44, which are biased outwardly and yieldable inwardly, releasably secure the tray in the supporting side tracks 24. Upon the application of heat, the bimetallic lever arms 60 move the block members 66 into the space defined by the aligned apertures 68 and notches 70, formed in the tray supporting tracks and in the side panel flanges of tray 18. The block members remain in this engaged position until the tray has cooled sufficiently to be safely removed and emptied or inverted. Upon cooling, the lever arms return to their resting position, thereby disengaging blocks 66 from the aligned apertures and notches, as shown in FIGS. 5 and 6.

Thus, while an embodiment of a dual fuel barbecue grill and modifications thereof have been shown and described in detail herein, various other changes and modifications may be made without departing from the scope of the present invention.

I claim:

1. In a barbecue grill assembly having a firebox with a burner element mounted near the floor of the firebox for producing and sustaining heat therein, wherein the improvement comprises support track means disposed in opposing relationship along opposed side walls of said firebox, a tray means received in said track means and including a plurality of primary channel members spanning said tray means and disposed in a plane above and parallel to the plane of said burner element, said tray means having a first position in which said primary channel members are disposed so as to receive charcoal briquettes therein and an inverted position in which said channel members are disposed in shielding relationship to said burner element for absorbing and radiating heat generated therefrom.

2. In a barbecue grill assembly as defined in claim 1, wherein said primary channel members have a generally semicircular configuration with the open portion thereof facing upwardly when in said first position for receiving charcoal briquettes in said primary channel members.

3. In a barbecue grill assembly as defined in claim 2, said assembly including a locking means selectively engageable with said tray means and said track means for securing said tray means in said track means.

4. In a barbecue grill assembly as defined in claim 1, said tray means including secondary channel members spanning said tray means in a plane below that of said primary channel members when said tray means is in said first position for receiving and retaining overflow ash from the charcoal briquettes.

5. In a barbecue grill assembly as defined in claim 4, said tray means including a locking means repsonsive to heating of said tray means, having a lever arm with one end secured to said tray means and a free end with a block means secured thereto, and said track means including apertures for receiving said block means and locking said tray means in said track means, said lever arms having a first position biased away from said track means and a second position in which heating of said lever arms causes said lever arms to move said block means into registry with said apertures.

6. In a barbecue grill assembly as defined in claim 1, said tray means including a locking means repsonsive to heating of said tray means, having a lever arm with one end secured to said tray means and a free end with a block means secured thereto, and said track means including apertures for receiving said block means and locking said tray means in said track means, said lever arms having a first position biased away from said track means and a second position in which heating of said lever arms causes said lever arms to move said block means into registry with said apertures.

7. In a barbecue grill assembly as defined in claim 1, said support track means having inwardly extending upper flanges with notches formed therein and said tray means includes spring-biased locking clip means engageable with said notches for releasably securing said tray means in said track means.

8. A barbecue grill assembly as defined in claim 1 in which said firebox includes an aperture in one of the vertical walls thereof for receiving said tray means therethrough.

9. A barbecue grill assembly having a dual mode of operation, said assembly comprising a firebox with a burner element mounted near the floor of said firebox, support track means disposed in parallel, longitudinal relationship to the opposing side walls of said firebox, a tray means disposed in said track means and having side wall portions disposed in said track means with a plurality of spaced, semicircular channel members secured to said side wall portions for spanning the area above said burner element, said tray means having a first position in which said channel members are disposed so as to receive charcoal briquettes therein for ignition by said burner element and cooking in a charcoal mode, and an inverted position with said channel members facing downwardly toward said burner element for shielding said burner element and for absorbing and transmitting heat generated therefrom.

10. A barbecue grill assembly as defined in claim 9, said tray means including secondary channel members spanning said tray means in a plane below that of said primary channel members when said tray means is in said first position for receiving and retaining overflow ash from the charcoal briquettes.

11. A barbecue grill assembly as defined in claim 9, said tray means including a locking means repsonsive to heating of said tray means, having a lever arm with one end secured to said tray means and a free end with a block means secured thereto, and said track means including apertures for receiving said block means and locking said tray means in said track means, said lever arms having a first position biased away from said track means and a second position in which heating of said lever arms causes said lever arms to move said block means into registry with said apertures.

12. A barbecue grill assembly as defined in claim 11 in which said tray means includes baffle plate means disposed parallel to said channel members at both front and back ends of said tray means for deflecting heat from said burner toward said channel members.

13. A barbecue grill assembly as defined in claim 9 in which said firebox includes strut means extending laterally from the side walls of said firebox for receiving and securing said support track means thereto.

14. A barbecue grill assembly as defined in claim 13 in which said firebox includes an aperture in one of the vertical walls thereof for receiving said tray means therethrough.

15. A barbecue grill assembly capable of utilizing a burner element in one mode for cooking and charcoal briquettes in another mode for cooking, said assembly comprising a firebox defined by generally vertical sidewalls, a floor, and an open top, support track means disposed along opposed sidewalls, a tray means received in said support track means and having a plurality of channel members spanning said firebox above said burner element, said firebox also including means in one of said vertical sidewalls defining an aperture for receiving said tray means therethrough, said tray means being insertable in a first position in which said channel means are oriented for holding charcoal and a second position in which said tray means is inverted for disposing said channels in shielding relationship to said burner element.

16. A barbecue grill assembly as defined in claim 15, wherein said channel members have a generally semicircular configuration with the open portion thereof facing upwardly when in said first position for receiving charcoal briquettes in said primary channel members.

17. A barbecue grill assembly as defined in claim 15, said tray means including a locking means repsonsive to heating of said tray means, having a lever arm with one end secured to said tray means and a free end with a block means secured thereto, and said track means including apertures for receiving said block means and locking said tray means in said track means, said lever arms having a first position biased away from said track means and a second position in which heating of said lever arms causes said lever arms to move said block means into registry with said apertures.

18. A barbecue grill assembly as defined in claim 15, said support track means having inwardly extending upper flanges with notches formed therein and said tray means includes spring-biased locking clip means engageable with said notches for releasably securing said tray means in said track means.

19. A barbecue grill assembly as defined in claim 15 in which said firebox includes strut means extending laterally from the side walls of said firebox for receiving and securing said support track means thereto.

20. In a barbecue grill assembly as defined in claim 19, said tray means including secondary channel members spanning said tray means in a plane below that of said primary channel members when said tray means is in said first position for receiving and retaining overflow ash from the charcoal briquettes.

* * * * *